United States Patent
Kline et al.

(10) Patent No.: US 9,031,907 B2
(45) Date of Patent: May 12, 2015

(54) INTEGRATION OF PUSH SERVICES WITH APPLICATIONS

(75) Inventors: Rob Kline, Richmond Hill (CA); Julian Paas, Mississauga (CA)

(73) Assignee: BlackBerry Limited, Waterloo (CA)

(*) Notice: Subject to any disclaimer, the term of this patent is extended or adjusted under 35 U.S.C. 154(b) by 1649 days.

(21) Appl. No.: 11/406,291

(22) Filed: Apr. 19, 2006

(65) Prior Publication Data

US 2006/0235872 A1 Oct. 19, 2006

Related U.S. Application Data

(60) Provisional application No. 60/672,540, filed on Apr. 19, 2005.

(51) Int. Cl.
G06F 7/00 (2006.01)
H04L 29/08 (2006.01)
G06Q 30/02 (2012.01)
H04M 1/725 (2006.01)

(52) U.S. Cl.
CPC ............... *H04L 67/26* (2013.01); *G06Q 30/02* (2013.01); *H04M 1/72522* (2013.01); *H04M 1/72561* (2013.01); *H04M 1/72566* (2013.01); *H04L 67/04* (2013.01)

(58) Field of Classification Search
USPC ......................................................... 707/629
See application file for complete search history.

(56) References Cited

U.S. PATENT DOCUMENTS

| 6,278,449 | B1 | 8/2001 | Sugiarto et al. | |
|---|---|---|---|---|
| 2002/0128036 | A1* | 9/2002 | Yach et al. | 455/552 |
| 2004/0077340 | A1 | 4/2004 | Forsyth | |
| 2004/0203670 | A1* | 10/2004 | King et al. | 455/414.3 |
| 2004/0203712 | A1* | 10/2004 | Murai et al. | 455/422.1 |
| 2004/0249846 | A1 | 12/2004 | Randall et al. | |
| 2005/0154796 | A1* | 7/2005 | Forsyth | 710/1 |
| 2005/0256892 | A1* | 11/2005 | Harken | 707/101 |

FOREIGN PATENT DOCUMENTS

| EP | 1486889 | 12/2004 |
|---|---|---|
| JP | 09128441 | 5/1997 |
| WO | 0217075 | 2/2002 |
| WO | WO03/075547 | 12/2003 |
| WO | WO2005/125241 | 12/2005 |

OTHER PUBLICATIONS

"Electronic Climatical Scheduler Mechanism", IBM Technical Disclosure Bulletin, IBM Corp., vol. 37, No. 4A, Apr. 1, 1994, p. 121/122, XP000446208.
Office Action dated Apr. 26, 2011 for corresponding Canadian Patent Application No. 2,604,937.

* cited by examiner

*Primary Examiner* — Truong Vo
(74) *Attorney, Agent, or Firm* — Ridout & Maybee LLP

(57) ABSTRACT

An application program on a mobile device provides a user interface that integrates application data with data from a push data service from a remote server. The integration of application data and pushed data is performed on the basis of a common element shared between the application data and the pushed data.

25 Claims, 5 Drawing Sheets

FIG. 3

| | |
|---|---|
| Content Element 1 | Content Data 1 |
| Content Element 2 | Content Data 2 |
| Content Element 3 | Content Data 3 |
| Content Element 4 | Content Data 4 |
| ⋮ Pushed Data | |

FIG. 4

| | | | | |
|---|---|---|---|---|
| April 6, 2005 | Sunny | 1°C | 10%POP | ☀ |
| April 7, 2005 | Sunny | 6°C | 20%POP | ☀ |
| April 8, 2005 | Cloudy w Showers | 5°C | 80%POP | ☁☂ |
| April 9, 2005 | P. Cloudy | 8°C | 30%POP | ⛅ |
| ⋮ Pushed Data | | | | |

INTEGRATION OF PUSH SERVICES WITH APPLICATIONS

CROSS-REFERENCE TO RELATED APPLICATIONS

The present application claims priority to U.S. provisional application Ser. No. 60/672,540, filed Apr. 19, 2005, and owned in common herewith, the contents of which are incorporated by reference.

COPYRIGHT NOTICE

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyrights whatsoever.

FIELD OF THE APPLICATION

The present application relates to push services for providing data to a mobile device over a wireless network and, in particular, to integration of a push service with an application resident on the mobile device.

BACKGROUND OF THE APPLICATION

Known handheld mobile devices incorporate a number of application programs for performing various functions or activities on the device. An application program typically provides for display of a user interface so as to communicate application data to the user visually.

It would be advantageous to improve the user interface so as to provide the user with additional information and thereby increase the utility and functionality of an application program.

BRIEF DESCRIPTION OF THE DRAWINGS

Reference will now be made, by way of example, to the accompanying drawings which show an embodiment of the present application, and in which:

FIG. 3 shows, in diagrammatic form, an embodiment of pushed data;

FIG. 4 shows, in diagrammatic form, a further embodiment of the pushed data;

Similar reference numerals are used in different figures to denote similar components.

DESCRIPTION OF SPECIFIC EMBODIMENTS

Figure 1:
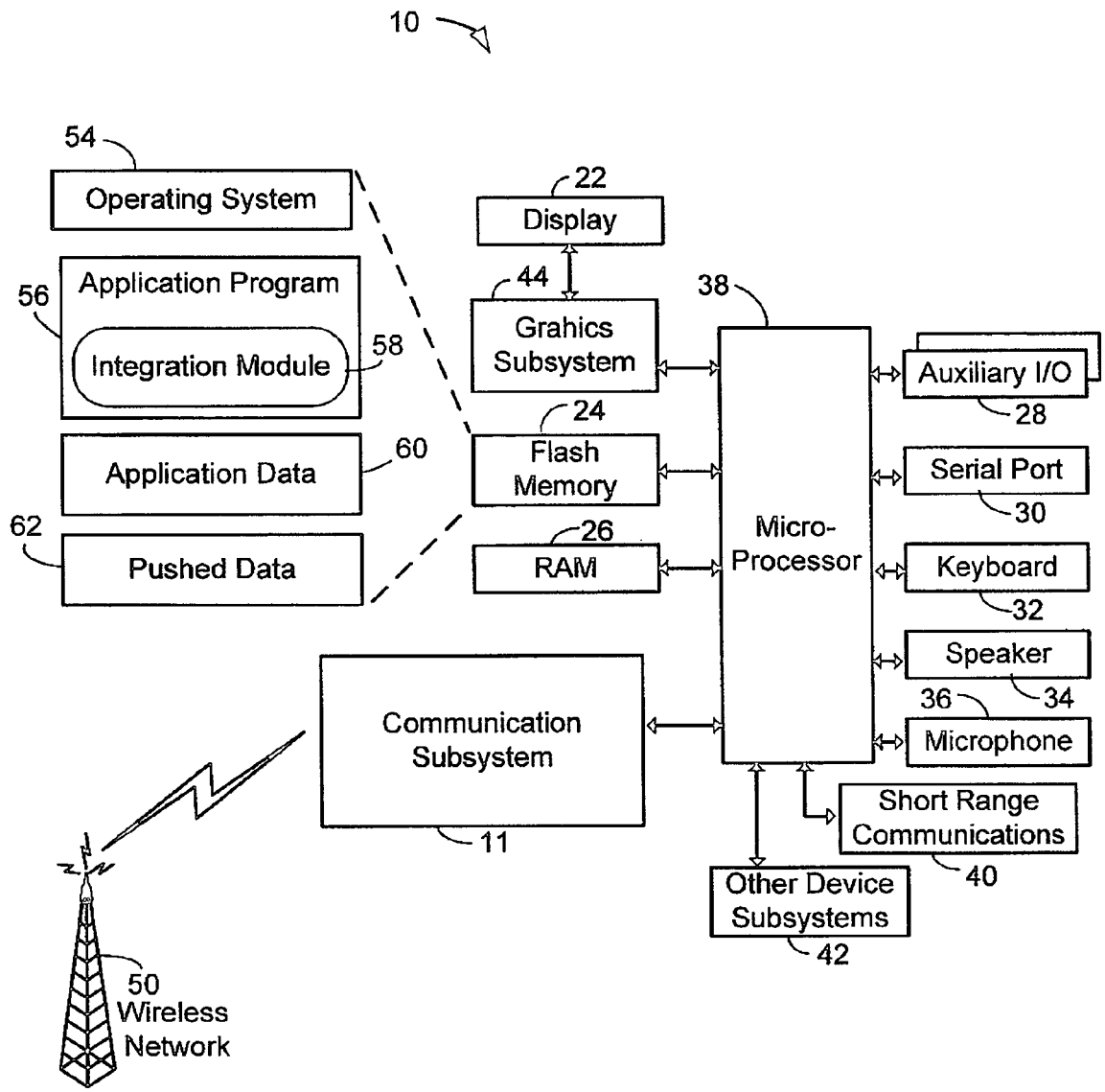
FIG. 1 shows a block diagram of a user device to which the present invention is applied in an example embodiment.

The following description of one or more specific embodiments does not limit the implementation of this application to any particular computer programming language or system architecture. The present application is not limited to any particular operating system, mobile device architecture, or computer programming language.

The present application provides for integration of a push data service with an application program on a mobile device so as to display integrated information to a user. The integration of application data and pushed data is performed on the basis of a common element shared between the application data and the pushed data.

In one aspect, the present application provides a method of providing a user interface for an application program on a mobile device. The device includes a display and a memory storing application data for use by the application program, wherein the display renders the user interface for the application program. The application data includes data associated with an application element. The method includes steps of receiving pushed data from a push service, the pushed data including content data associated with a content element, and integrating the content data into the application data on the basis of concordance between the content element and the application element, so as to generate integrated data. The method also includes displaying the integrated data within the user interface.

In another aspect, the present application provides a wireless mobile device having an application program. The device includes a display screen for displaying a user interface for the application program, a memory containing application data for use by the application program, the application data including data associated with an application element, and a communication module for receiving pushed data from a push service, the pushed data including content data associated with a content element. The device also includes an integration module for integrating the content data into the application data on the basis of concordance between the content element and the application element, so as to generate integrated data. The integrated data is displayed within the user interface.

In yet another aspect, the present application provides a computer program product having a computer-readable medium tangibly embodying computer executable instructions for providing a user interface for an application program on a mobile device. The device includes a display and a memory storing application data for use by the application program, wherein the display renders the user interface for the application program. The application data includes data associated with an application element. The mobile device receives pushed data from a push service, the pushed data including content data associated with a content element. The computer executable instructions include computer executable instructions for integrating the content data into the application data on the basis of concordance between the content element and the application element, so as to generate integrated data. They also include computer executable instructions for displaying the integrated data within the user interface.

Referring now to the drawings, FIG. 1 is a block diagram of a user device to which the present invention is applied in an example embodiment. In the example embodiment, the user device is a two-way mobile communication device 10 having data and possibly also voice communication capabilities. In an example embodiment, the device 10 has the capability to communicate with other computer systems on the Internet. Depending on the functionality provided by the device 10, in various embodiments the device may be a data communication device, a multiple-mode communication device configured for both data and voice communication, a mobile telephone, a PDA enabled for wireless communication, or a computer system with a wireless modem, among other things.

In this embodiment, the device 10 includes a communication subsystem 11, including a receiver, a transmitter, and associated components such as one or more, preferably embedded or internal, antenna elements, and a processing module such as a digital signal processor (DSP). In some embodiments, the communication subsystem includes local oscillator(s), and in some embodiments the communication subsystem 11 and a microprocessor 38 share an oscillator. As will be apparent to those skilled in the field of communications, the particular design of the communication subsystem 11 will be dependent upon the communication network in which the device 10 is intended to operate.

Signals received by the antenna through a wireless network 50 are input to the receiver, which may perform such common receiver functions as signal amplification, frequency down conversion, filtering, channel selection and the like, and in some embodiments, analog to digital conversion. In a similar manner, signals to be transmitted are processed, including modulation and encoding for example, by the DSP and input to the transmitter for digital to analog conversion, frequency up conversion, filtering, amplification and transmission over the wireless network 50 via the antenna 18.

The device 10 includes the microprocessor 38 that controls the overall operation of the device. The microprocessor 38 interacts with communication subsystem 11 and also interacts with further device subsystems such as the graphics subsystem 44, flash memory 24, random access memory (RAM) 26, auxiliary input/output (I/O) subsystems 28, serial port 30, keyboard or keypad 32, speaker 34, microphone 36, a short-range communications subsystem 40, and any other device subsystems generally designated as 42. The graphics subsystem 44 interacts with the display 22 and renders graphics or text upon the display 22.

Operating system software 54 and various software applications used by the microprocessor 38 are stored in a computer-readable storage medium and, in one example embodiment, stored in a persistent store such as flash memory 24 or similar storage element. Those skilled in the art will appreciate that the operating system 54, software applications, such as application program 56, or parts thereof, may be temporarily loaded into a volatile store such as RAM 26.

The microprocessor 38, in addition to its operating system functions, preferably enables execution of software applications on the device. A predetermined set of software applications which control basic device operations, including at least data and voice communication applications for example, will normally be installed on the device 10 during manufacture. Further software applications may also be loaded onto the device 10 through the network 50, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a data communication mode, a received signal such as a text message or web page download will be processed by the communication subsystem 11 and input to the microprocessor 38, which will preferably further process the received signal for output to the display 22 through the graphics subsystem 44, or alternatively to an auxiliary I/O device 28. It is contemplated that the auxiliary I/O device includes an image rendering subsystem like the graphics subsystem 44 for rendering graphics and text upon the auxiliary I/O device 28. For example, a printer includes an image rendering subsystem for receiving and rendering image data. A user of device 10 may also compose data items within a software application, such as email messages for example, using the keyboard 32 in conjunction with the display 22 and possibly an auxiliary I/O device 28. Such composed items may then be transmitted over a communication network through the communication subsystem 11.

The serial port 30 in FIG. 1 would normally be implemented in a personal digital assistant (PDA)-type communication device for which synchronization with a user's desktop computer (not shown) may be desirable, but is an optional device component. Such a port 30 would enable a user to set preferences through an external device or software application and would extend the capabilities of the device by providing for information or software downloads to the device 10 other than through a wireless communication network.

A short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices. The device 10 may be a handheld device.

Wireless network 50 is, in an example embodiment, a wireless packet data network, (e.g. Mobitex™ or DataTAC™), which provides radio coverage to mobile devices 10. Wireless network 50 may also be a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems).

Figure 2:
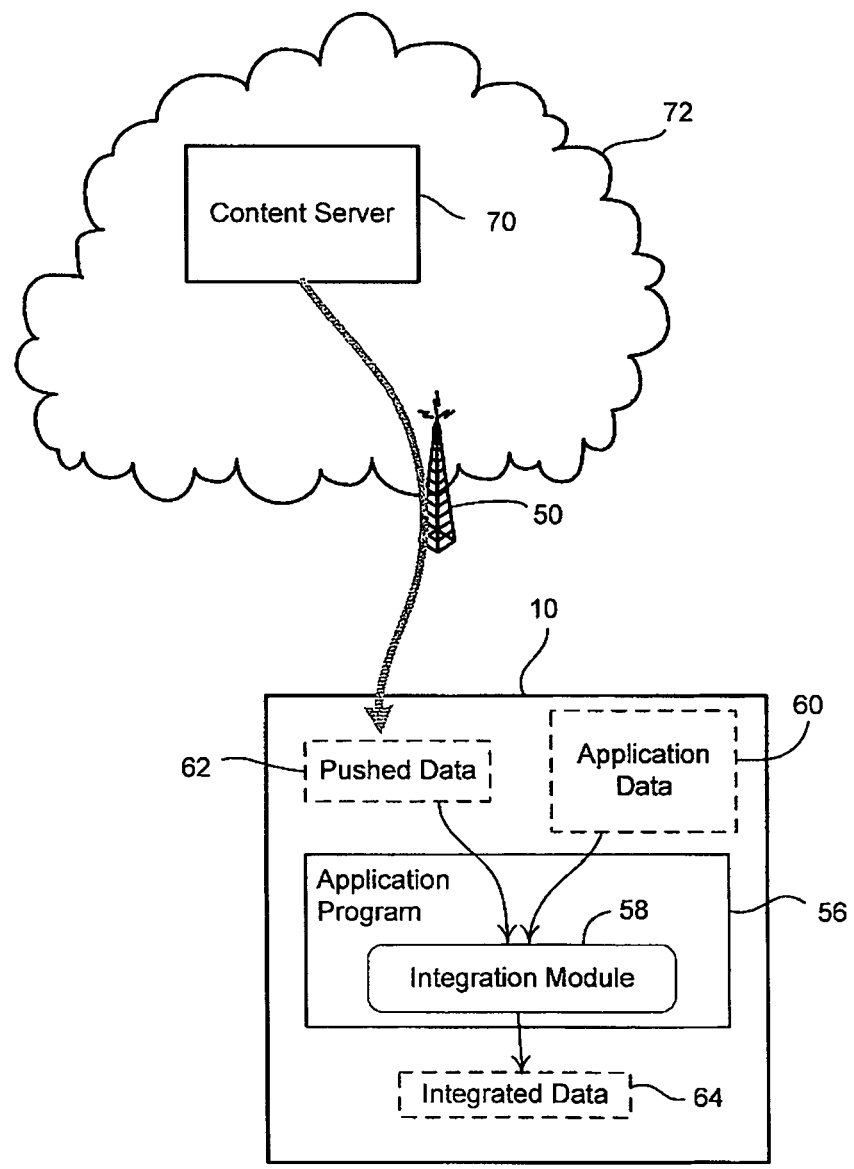
FIG. 2 shows a block diagram representation of a mobile device adapted to receive a push data service in accordance with the present application.

FIG. 2 shows a block diagram representation of a mobile device 10 adapted to receive a push data service in accordance with the present application. Reference is now made to FIGS. 1 and 2 together. The mobile device 10 includes the application program 56, which interacts with a user through the generation of a user interface on the display 22. The application program 56 may be a wide variety of software applications. In one embodiment, the application program 56 includes a scheduling or calendar program, although the present specification is not limited to calendar programs.

The mobile device 10 also includes application data 60. The application data 60 is used by the application program 56 to generate the user interface. For example, the application data 60 may provide content and information intended for display in the user interface.

The mobile device 10 further includes pushed data 62. The pushed data 62 comprises data received by the mobile device 10 through a push data feed service. A push data feed service is a service provided by a remote content server 70 that pushes data content to the mobile device 10. A mobile device user typically registers with the remote content server 70 to request inclusion in the push service. The push service may push updated data to the mobile device 10 with a set frequency or intermittently as the data is updated.

The remote content server 70 sends pushed data 62 to the mobile device 10 through a network 72 connected to the wireless network 50. The network 72 may include a plurality of interconnected networks, both public and private. In some embodiments, the network 72 comprises the Internet.

By way of example, the pushed data 62 may relate to news events. When a news item is created at the remote content server 70, the remote server pushes the news item out to registered mobile devices 10 as pushed data 62. The mobile device 10 may include a pushed data application or module (not shown) that causes an icon or other indicator to appear on the display. For example, an icon may appear on a task bar or ribbon on the display. If the user chooses to select the icon, i.e. elects to view the pushed data, then the mobile device 10 may launch a convention HTML browser or other display program to display the content of the pushed data 62 to the user on the display 10. In this example, the mobile device 10 may launch a text-rendering program, such as a browser, to render the news item on the display 22.

In some embodiments, the pushed data 62 may include addresses, such as websites or webpages, at which additional data or information may be found. In some embodiments, the mobile device 10 may present a link to the user so that the user may selectively browse the linked address at their discretion. In other embodiments, the mobile device 10 may automatically link to the address in order to download additional pushed data 62 for display to the user.

The pushed data 62 is not necessarily textual data and may include multimedia data, including video and/or audio clips.

In the present embodiment, the application program 56 includes an integration module 58. The integration module 58 integrates the pushed data 62 into the application data 60 so as to produce integrated data 64, which is then used by the application program 56 to generate the user interface on the display 22. In this manner the content provided by a pushed data service may be integrated with the data of an existing application program on the mobile device 10.

Reference is now made to FIG. 3, which shows, in diagrammatic form, an embodiment of the pushed data 62.

The pushed data 62 includes a content data field 84 and at least one content element 82. The pushed data 62 may include a plurality of content elements 82 (shown individually as 82a, 82b, 82c, 82d, . . . ), each of which has a corresponding content data field 84 (shown individually as 84a, 84b, 84c, 84d, . . . ). In one embodiment, the pushed data 62 is organized or structured in accordance with the correspondence between content elements 82 and content data fields 84. In other words, the content data fields 84 are organized according to their association with particular content elements 82.

To illustrate an example embodiment, reference is made to FIG. 4, which shows, in diagrammatic form, a further embodiment of the pushed data 62. In this embodiment, the pushed data 62 relates to weather forecasts. The content element 82 is a date and the content data fields 84 include weather forecast data. As will be seen from FIG. 4, particular weather information corresponds to a particular date, i.e. particular content data fields 84 correspond to a particular content element 82.

In this embodiment, the content data field 84 may include more than one type of weather forecast information. For example, each content data field 84 may include a text descriptor 86 describing the expected weather conditions, a text temperature 88 specifying a predicted daily high, a text precipitation value 90 specifying a predicted likelihood of precipitation, and a graphic image 92 indicating the expected weather conditions. The content data field 84 may include other information, including animated icons, applets, and other features.

Referring again to FIGS. 1 through 4, the application data 60 includes an application element that corresponds to the content element 82 of the pushed data 62. In one embodiment, wherein the content element 82 comprises a date, the application data includes corresponding dates. The application data includes data or data fields associated with individual application elements. For example, in the context of a calendar program, the application data may include appointment data, or an appointment field associated with a particular date. It will be appreciated that the application data may include other information such as individual time fields or other details that may be associated with the appointment data.

The pushed data 62 is integrated into the application data 60 to form the integrated data 64 on the basis of concordance between content elements 82 in the pushed data 62 and application elements in the application data 60. For example, where the content elements 82 and application elements comprise dates, the integration is performed on the basis of common dates. In other words, a particular content data field 84 or its contents is integrated into the application data 60 sharing an association with the same date.

With the example embodiment shown in FIG. 4 relating to weather forecast information, the integration module 58 integrates the weather forecast information, or a portion thereof, into the application data 60 relating to the same date. The application program may comprise a scheduling or calendar program. In such an embodiment, the weather forecast information is integrated with the application data corresponding to the same date, such that when the calendar program generates a display of calendar information relating to that date, the display incorporates the pushed weather information relating to that date.

Figure 5:
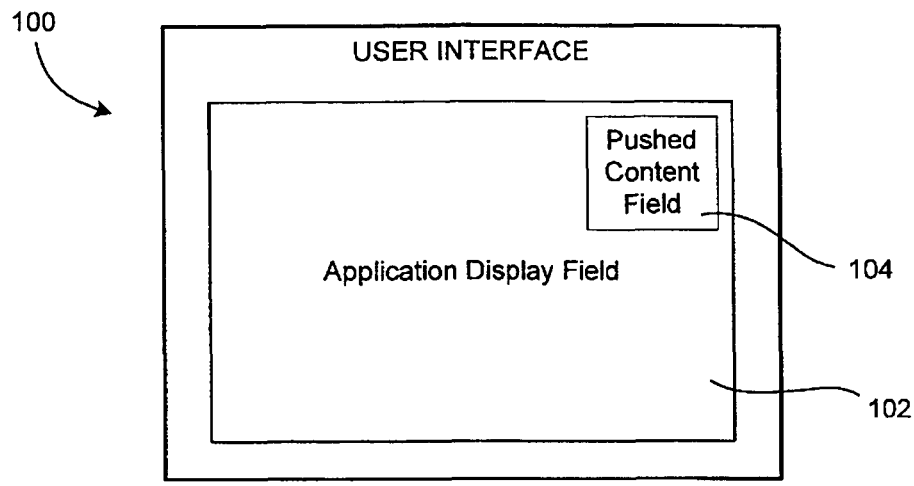
FIG. 5 diagrammatically shows an embodiment of a user interface for rendering integrated data on a mobile device.

Reference is now made to FIG. 5, which diagrammatically shows an embodiment of a user interface 100 for rendering integrated data on a mobile device. The user interface 100 may include an application display field(s) 102 and a pushed content field 104. The pushed content field 104 may be defined within the application display field 102 and incorporated as a part of the application user interface.

The application display field 102 displays at least a portion of the application data 60 (FIG. 2). The pushed content field 104 displays at least a portion of the pushed data 62 (FIG. 2). In other words the user interface 100 displays at least a portion of the integrated data 64 (FIG. 2). The user interface displays the application data 60 and the pushed data 62 sharing an association with a common element, i.e. concordance between the associated application element and content element.

Figure 6:
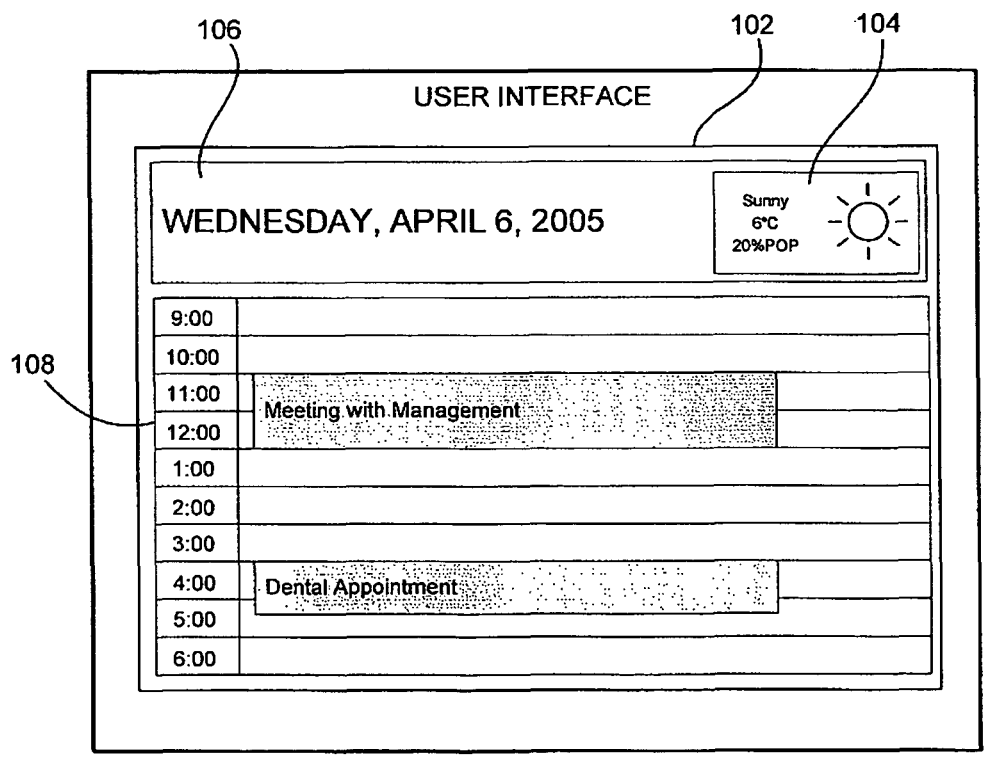
FIG. 6 diagrammatically shows an example embodiment of the mobile device user interface for a calendar application incorporating a pushed data weather forecast.

FIG. 6 illustrates an example embodiment of the mobile device user interface 100 incorporating a pushed data weather forecast into a calendar application.

The application display field 102 includes a banner section 106 and an appointment section 108. The banner section 106 includes date information and incorporates the pushed content field 104. The appointment section 108 includes a number of timeslots or time fields into which appointment data may be placed. For example, the appointment data may include data regarding a "Meeting with Management" beginning at 11:00 and having a duration of two hours. The appointment data is indicated graphically and textually in the appointment section 108.

The appointment data displayed in the appointment section 108 corresponds to the date information shown in the banner section 106. In particular, the 11:00 meeting is associated with the date of Apr. 6, 2005.

The pushed content field 104 contains information from the content data field 84 (FIG. 4) corresponding to the date information in the banner section 106. The information shown in the pushed content field 104 of the user interface 100 may include all or only a portion of the data from the content data field 84 received from the push service.

It will be appreciated that in the example embodiment illustrated in FIG. 6, the calendar application user interface incorporates weather forecast information obtained through a push data service and integrates it into the calendar data based upon a common date. Advantageously, the user will have a weather forecast for a particular day displayed in the calendar interface when accessing calendar appointment data relating to that date. Accordingly, the user may take into account the weather forecast when considering scheduling decisions.

Figure 7:
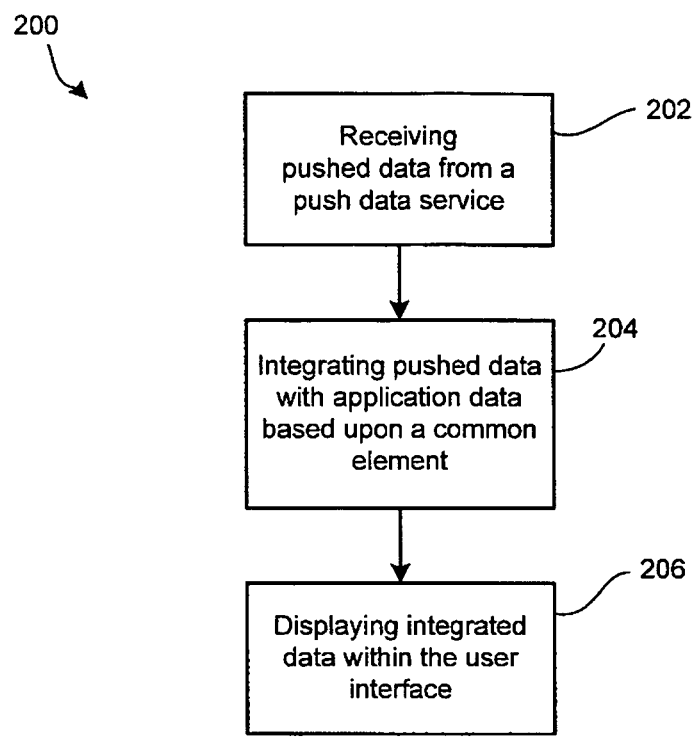
FIG. 7 shows, in flowchart form, a method for providing a user interface for an application program integrating pushed data.

Reference is now made to FIG. 7, which shows, in flowchart form, a method 200 for providing a user interface for an application program integrating pushed data.

The method 200 begins in step 202 with the mobile device receiving pushed data from a pushed data service. As described above, the pushed data includes a plurality of content data fields 84 (FIG. 3) each having an associated content element 82 (FIG. 3). The mobile device may subscribe to the pushed data service. The pushed data may be received at set time intervals, e.g. daily, hourly, etc., or intermittently.

In step 204, the integration module 58 (FIG. 1) integrates the pushed data with the application data. The integration is performed on the basis of a common element. In particular, the pushed data corresponding to a particular content element is integrated with the application data corresponding to the same element within the application data. The integration module 58 produces integrated data. It will be appreciated that the step of integration may be performed upon receipt of the pushed data and the integrated data may be stored in memory as such. In another embodiment, the pushed data resides in memory in the form received and the integration step 204 is performed dynamically in the rendering of the user interface.

Step 206 includes displaying the integrated data, i.e. the application data and pushed data corresponding to a particular common element, within a user interface. This may include rendering text and/or graphics and any other display steps necessary to communicate the integrated data to the user through the display.

Those of ordinary skill in the art will appreciate that the present application is not limited to calendar applications and/or weather forecast push services. Any other type of application program and/or push service data wherein a common element is shared between the application data and the pushed data is within the scope of the present application. Moreover, the common element between the application data and the pushed data is not limited to date information. Any other common organizational element may be used.

For example, a personal contacts or address book application may display contact data for individuals. An entry for each individual may include a name, phone numbers, work address, home address, and other individual data. A push service may, in one embodiment, provide updated address information which may be integrated with the application contact data on the basis of concordance with the individual's name. In another embodiment, the push service may supply current location information for the individual, such as GPS tracking information, which could include a map display of the location.

In another example, the pushed data may include audio clips and/or video clips. In one embodiment, a pushed video or audio clip may be integrated into the interface of an application, such as, for example, a stock exchange trading application. The pushed video or audio clip may relate to recent news or company information.

Other example embodiments will be appreciated by those of ordinary skill in the art having regard to the foregoing description.

It will also be appreciated that the present application may be extended to integration of push service data with application data on the basis of two or more common elements.

Those of ordinary skill in the art will further understand that in some embodiments the integration module 58 (FIG. 1) may be implemented outside of the application program 56 (FIG. 1).

The present application may be embodied in other specific forms without departing from the spirit or essential characteristics thereof. Certain adaptations and modifications will be obvious to those skilled in the art. Therefore, the above discussed embodiments are considered to be illustrative and not restrictive.

What is claimed is:

1. A method of providing a user interface for an application program on a mobile device, the device including a display and a memory storing application data for use by the application program, wherein the display renders the user interface for the application program, and wherein the application data includes application content associated with an application element, the method being implemented by the mobile device and comprising the steps of:
    receiving pushed data from a push service, the pushed data including content data associated with a content element, the content data including video;
    storing the pushed data in the mobile device in a format as received;
    the mobile device integrating the content data into the application data on the basis of concordance between the content element and the application element, so as to generate integrated data within the mobile device, wherein the integrating is performed dynamically in the rendering of the user interface; and
    displaying the integrated data including the video within the user interface.

2. The method claimed in claim 1, wherein the content element comprises a plurality of content elements and wherein the pushed data includes content data fields each associated with one of the plurality of content elements, and wherein the application element includes a plurality of application elements each having associated application data, and wherein the step of integrating includes integrating the content data fields with the associated application data on the basis of each content element and its corresponding application element.

3. The method claimed in claim 1, wherein the application element and the content element each comprise dates.

4. The method claimed in claim 3, wherein the step of integrating includes integrating content data associated with a particular date into application data associated with the same particular date.

5. The method claimed in claim 4, wherein the step of displaying the integrated data includes displaying the application data and the content data associated with the same date.

6. The method claimed in claim 1, wherein the user interface includes a plurality of fields including at least one application field for displaying the application data associated with a given application element, and wherein the at least one application field further includes a content field for displaying the content data associated with the content element corresponding to the given application element.

7. The method claimed in claim 1, wherein the application program comprises a calendar program, the application data comprises appointment data, and the application element comprises a date.

8. The method claimed in claim 7, wherein the content data comprises information regarding weather forecasts.

9. The method claimed in claim 8, wherein the content data includes a graphical image or icon indicative of the weather forecast.

10. A wireless mobile device having an application program, comprising:
   a display screen for rendering and displaying a user interface for the application program;
   a memory containing application data for use by the application program, the application data including application content associated with an application element;
   a communication subsystem for receiving pushed data from a push service, the pushed data including content data associated with a content element, the content data including video; and
   an integration module for storing the pushed data in the memory in a format as received and integrating the content data into the application data on the basis of concordance between the content element and the application element, so as to generate integrated data, wherein the integrating is performed dynamically in the rendering of the user interface, and
   wherein the integrated data including the video is displayed within the user interface.

11. The mobile device claimed in claim 10, wherein the content element comprises a plurality of content elements and wherein the pushed data includes content data fields each associated with one of the plurality of content elements, and wherein the application element includes a plurality of application elements each having associated application data, and wherein the integration module integrates the content data fields with the associated application data on the basis of each content element and its corresponding application element.

12. The mobile device claimed in claim 10, wherein the application element and the content element each comprise dates.

13. The mobile device claimed in claim 12, wherein the integration module integrates content data associated with a particular date into application data associated with the same particular date.

14. The mobile device claimed in claim 13, wherein user interface displayed on the display screen includes the application data and the content data associated with the same date.

15. The mobile device claimed in claim 10, wherein the user interface includes a plurality of fields including at least one application field for displaying the application data associated with a given application element, and wherein the at least one application field further includes a content field for displaying the content data associated with the content element corresponding to the given application element.

16. The mobile device claimed in claim 10, wherein the application program comprises a calendar program, the application data comprises appointment data, and the application element comprises a date.

17. The mobile device claimed in claim 16, wherein the content data comprises information regarding weather forecasts.

18. The mobile device claimed in claim 17, wherein the content data includes a graphical image or icon indicative of the weather forecast.

19. A computer program product having a computer readable storage medium in a mobile device tangibly embodying computer executable instructions for providing a user interface for an application program on the mobile device, the device including a display and a memory storing application data for use by the application program, wherein the display renders the user interface for the application program, and wherein the application data includes application content associated with an application element, wherein the mobile device receives pushed data from a push service, the pushed data including content data associated with a content element, the content data including video, the computer executable instructions comprising:
   computer executable instructions for storing the pushed data in the memory in a format as received;
   computer executable instructions for integrating the content data into the application data on the basis of concordance between the content element and the application element, so as to generate integrated data, wherein the integrating is performed dynamically in the rendering of the user interface; and
   computer executable instructions for displaying the integrated data including the video within the user interface.

20. The computer program product claimed in claim 19, wherein the content element comprises a plurality of content elements and wherein the pushed data includes content data fields each associated with one of the plurality of content elements, and wherein the application element includes a plurality of application elements each having associated application data, and wherein the computer executable instructions for integrating include computer executable instructions for integrating the content data fields with the associated application data on the basis of each content element and its corresponding application element.

21. The computer program product claimed in claim 19, wherein the application element and the content element each comprise dates and wherein the computer executable instructions for integrating include computer executable instructions for integrating content data associated with a particular date into application data associated with the same particular date.

22. The computer program product claimed in claim 19, wherein the user interface includes a plurality of fields including at least one application field for displaying the application data associated with a given application element, and wherein the at least one application field further includes a content field for displaying the content data associated with the content element corresponding to the given application element.

23. The computer program product claimed in claim 19, wherein the application program comprises a calendar program, the application data comprises appointment data, and the application element comprises a date.

24. The computer program product claimed in claim 23, wherein the content data comprises information regarding weather forecasts.

25. The computer program product claimed in claim 24, wherein the content data includes a graphical image or icon indicative of the weather forecast.

* * * * *